(12) United States Patent
Tsunoya

(10) Patent No.: US 12,103,084 B2
(45) Date of Patent: Oct. 1, 2024

(54) METHOD FOR PRODUCING PRODUCT

(71) Applicant: Seiko Epson Corporation, Tokyo (JP)

(72) Inventor: Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 17/558,769

(22) Filed: Dec. 22, 2021

(65) Prior Publication Data

US 2022/0203443 A1 Jun. 30, 2022

(30) Foreign Application Priority Data

Dec. 25, 2020 (JP) ................. 2020-216427

(51) Int. Cl.
| | |
|---|---|
| *B22F 10/38* | (2021.01) |
| *B22F 3/22* | (2006.01) |
| *B22F 7/06* | (2006.01) |
| *B22F 10/10* | (2021.01) |
| *B22F 10/18* | (2021.01) |
| *B22F 10/64* | (2021.01) |
| *B22F 12/52* | (2021.01) |
| *B33Y 10/00* | (2015.01) |
| *B33Y 40/00* | (2020.01) |

(52) U.S. Cl.
CPC ............... *B22F 7/06* (2013.01); *B22F 3/225* (2013.01); *B22F 7/062* (2013.01); *B22F 10/10* (2021.01); *B22F 10/18* (2021.01); *B22F 10/38* (2021.01); *B22F 10/64* (2021.01); *B22F 12/52* (2021.01); *B33Y 10/00* (2014.12); *B33Y 40/00* (2014.12)

(58) Field of Classification Search
CPC ...................................................... B22F 10/38
See application file for complete search history.

(56) References Cited

U.S. PATENT DOCUMENTS

| | | | |
|---|---|---|---|
| 6,363,606 B1 * | 4/2002 | Johnson, Jr. ........... | B33Y 10/00 29/854 |
| 2020/0180083 A1 * | 6/2020 | Richard .................. | B22F 1/052 |
| 2020/0269491 A1 | 8/2020 | Fujimori et al. | |

FOREIGN PATENT DOCUMENTS

| | | |
|---|---|---|
| CN | 111605184 | 9/2020 |
| FR | 3035808 A | 11/2016 |
| JP | H06-330108 | 11/1994 |

* cited by examiner

*Primary Examiner* — Christopher S Kessler
(74) *Attorney, Agent, or Firm* — WORKMAN NYDEGGER

(57) ABSTRACT

A production method for producing a product by joining a first part containing an inorganic powder and a binder to a second part containing an inorganic powder and a binder is provided. The production method includes a first step of forming the first part by a three-dimensional shaping apparatus, a second step of forming the second part, a third step of assembling the first part and the second part, thereby obtaining an assembly, a fourth step of heating the assembly at a first temperature, and a fifth step of heating the assembly at a second temperature higher than the first temperature after the fourth step, wherein the first part has a first region that comes in contact with the second part and a second region that does not come in contact with the second part, and a melting point of the binder contained in the first region is lower than a melting point of the binder contained in the second region.

8 Claims, 10 Drawing Sheets

METHOD FOR PRODUCING PRODUCT

The present application is based on, and claims priority from JP Application Serial Number 2020-216427, filed Dec. 25, 2020, the disclosure of which is hereby incorporated by reference herein in its entirety.

BACKGROUND

1. Technical Field

The present disclosure relates to a method for producing a product.

2. Related Art

JP-A-6-330108 discloses a method, which relates to a technique for producing a product, and in which an ingot steel material having a shaft portion and a green compact having a hole portion obtained by compression molding a mixed powder containing an iron-based metal powder are joined together in a sintering step by controlling the amount of carbon in a surface layer of the shaft portion and the fitting dimension.

In the above-mentioned method, it is necessary to control the amount of carbon and the dimension, and therefore, the degree of difficulty in production is relatively high. Therefore, a technique for producing a product by joining multiple parts together using a simpler method has been awaited.

SUMMARY

According to a first aspect of the present disclosure, a production method for producing a product by joining a first part containing an inorganic powder and a binder to a second part containing an inorganic powder and a binder is provided. The production method includes a first step of forming the first part by a three-dimensional shaping apparatus, a second step of forming the second part, a third step of assembling the first part and the second part, thereby obtaining an assembly, a fourth step of heating the assembly at a first temperature, and a fifth step of heating the assembly at a second temperature higher than the first temperature after the fourth step, wherein the first part has a first region that comes in contact with the second part and a second region that does not come in contact with the second part, and a melting point of the binder contained in the first region is lower than a melting point of the binder contained in the second region.

According to a second aspect of the present disclosure, a production method for producing a product by joining a first part containing an inorganic powder and a binder to a second part containing an inorganic powder and a binder is provided. The production method includes a first step of forming the first part by a three-dimensional shaping apparatus, a second step of forming the second part, a third step of assembling the first part and the second part, thereby obtaining an assembly, a fourth step of heating the assembly at a first temperature, and a fifth step of heating the assembly at a second temperature higher than the first temperature after the fourth step, wherein the first part has a first region that comes in contact with the second part and a second region that does not come in contact with the second part, and a particle diameter of the inorganic powder contained in the first region is smaller than a particle diameter of the inorganic powder contained in the second region.

DESCRIPTION OF EXEMPLARY EMBODIMENTS

A. First Embodiment

Figure 1:
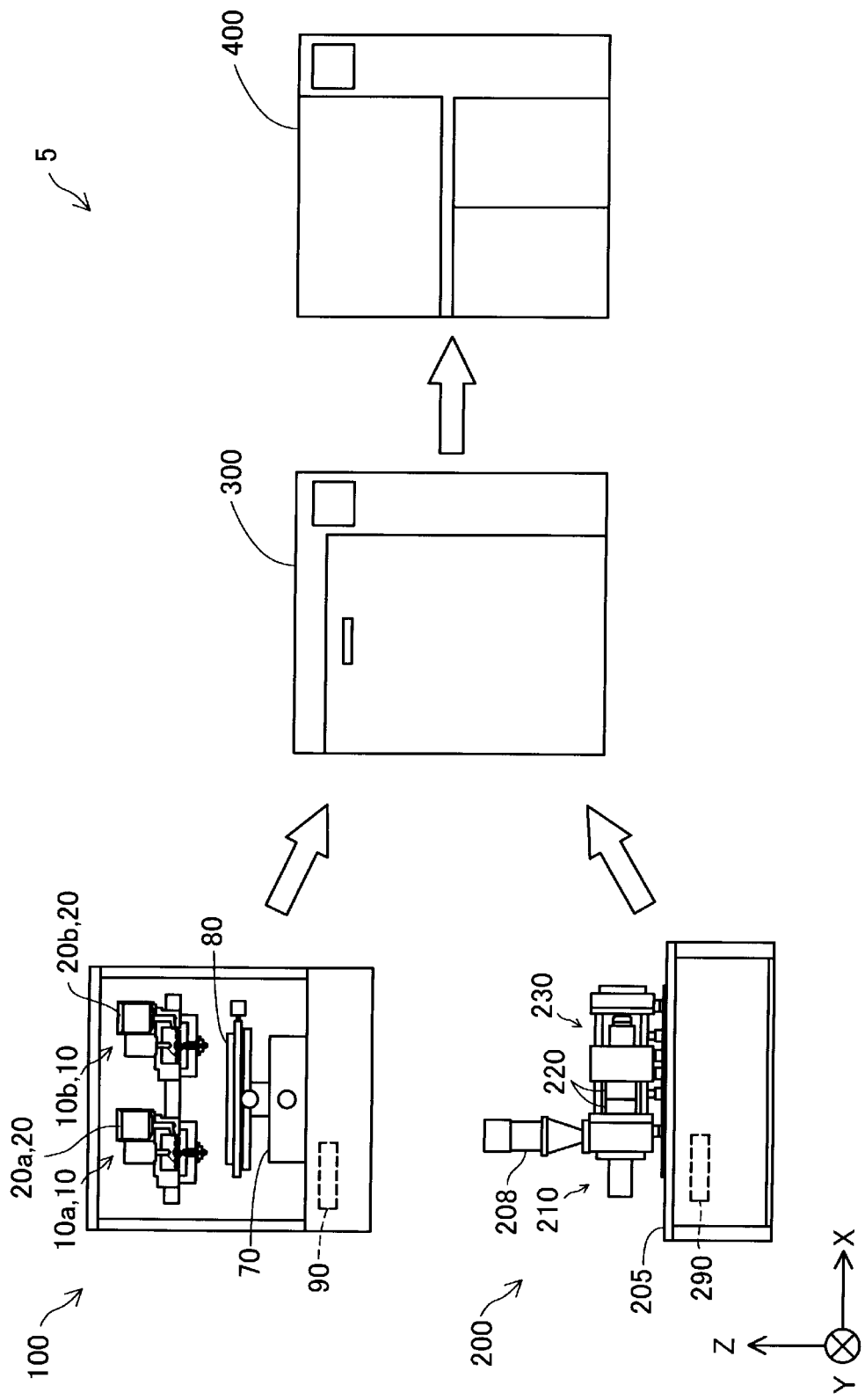
FIG. 1 is a view showing a schematic configuration of a production system in a first embodiment.

FIG. 1 is a view showing a schematic configuration of a production system 5 in a first embodiment. The production system 5 includes a three-dimensional shaping apparatus 100, an injection molding machine 200, a degreasing device 300, and a sintering furnace 400. The X, Y, and Z directions shown in FIG. 1 correspond to the X, Y, and Z directions shown in FIG. 2 and subsequent drawings.

The three-dimensional shaping apparatus 100 forms a first part containing an inorganic powder of a metal, a ceramic, or the like, and a binder by an additive manufacturing method. The injection molding machine 200 forms a second part containing an inorganic powder of a metal, a ceramic, or the like, and a binder by injection molding. The degreasing device 300 performs degreasing by heating an assembly obtained by assembling the first part and the second part at a first temperature. The sintering furnace 400 sinters the assembly by heating at a second temperature higher than the first temperature to complete the product. The "product" as used herein means a material produced by the production system 5, and includes a material to become a part of another product and a material to be subjected to a post-treatment or processing after sintering.

The three-dimensional shaping apparatus 100 includes a first ejection section 10a, a second ejection section 10b, a first hopper 20a, a second hopper 20b, a moving mechanism section 70, a stage 80, and a control unit 90. Hereinafter, when the first ejection section 10a and the second ejection section 10b are described without particularly making a distinction between them, these are sometimes simply referred to as "ejection section 10". Similarly, when the first hopper 20a and the second hopper 20b are described without particularly making a distinction between them, these are sometimes simply referred to as "hopper 20".

The moving mechanism section 70 changes the relative position of the ejection section 10 and the stage 80. In this embodiment, the moving mechanism section 70 moves the stage 80 with respect to the first ejection section 10a and the second ejection section 10b. The moving mechanism section 70 in this embodiment is constituted by a three-axis positioner for moving the stage 80 in three axis directions of the X, Y, and Z directions by the driving forces of three motors. Each motor drives under the control of the control unit 90. In other embodiments, the moving mechanism section 70 may, for example, be configured to move the ejection section 10 without moving the stage 80 instead of being configured to move the stage 80. In addition, the moving mechanism section 70 may be configured to move both the stage 80 and the ejection section 10.

The control unit 90 is constituted by a computer including one or more processors, a main storage device, and an input/output interface for performing signal input/output to/from the outside. In this embodiment, the control unit 90 exhibits various functions such as a function of executing a three-dimensional shaping process for shaping a three-dimensional shaped article by executing a program or a command read in the main storage device by the processor. The control unit 90 can shape a three-dimensional shaped article by selectively using the first ejection section 10a and the second ejection section 10b as appropriate so as to switch two different types of materials. The control unit 90 may be constituted by a combination of multiple circuits instead of a computer.

Figure 2:
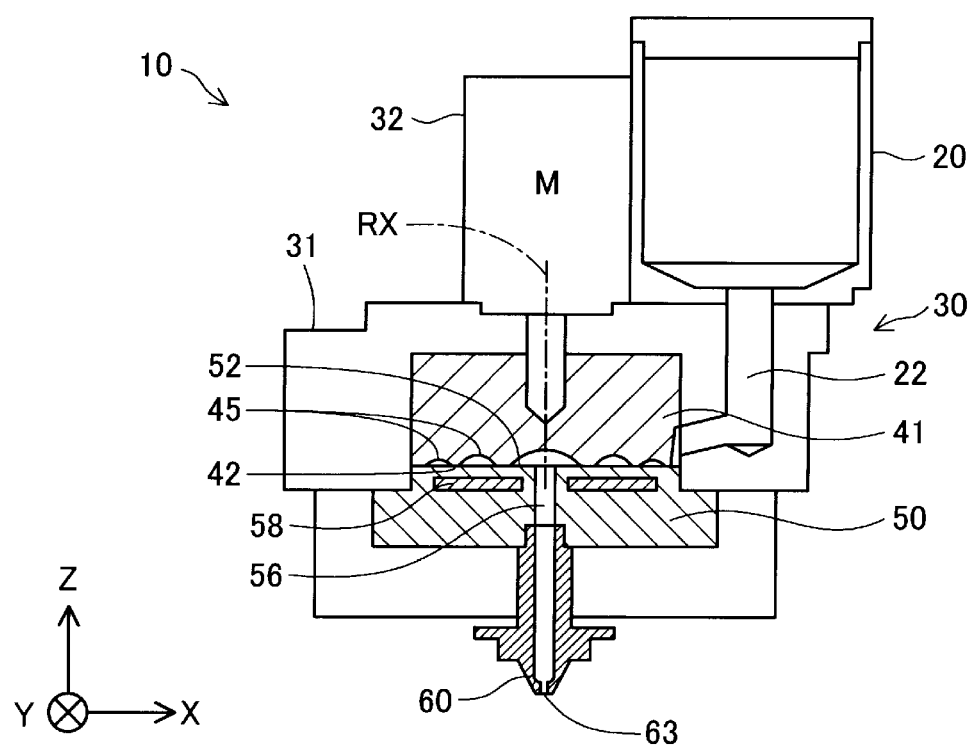
FIG. 2 is a view showing a schematic configuration of a hopper and an ejection section.

FIG. 2 is a view showing a schematic configuration of the hopper 20 and the ejection section 10 included in the three-dimensional shaping apparatus 100. The ejection section 10 includes a plasticizing section 30 and a nozzle 60. To the ejection section 10, a material stored in the hopper 20 is supplied. The ejection section 10 plasticizes at least a part of the material supplied from the hopper 20 by the plasticizing section 30 to form a plasticized material, and ejects the formed plasticized material onto the stage 80 from the nozzle 60 and stacks the material thereon under the control of the control unit 90. In this embodiment, the "plasticizing" means melting by applying heat to a material having thermoplasticity. The "melting" not only means converting a material having thermoplasticity to a liquid state by heating to a temperature equal to or higher than the melting point, but also means softening a material having thermoplasticity by heating to a temperature equal to or higher than the glass transition point so as to exhibit fluidity.

In the hopper 20, a material in a pellet form containing an inorganic powder of a metal, a ceramic, or the like, and a binder is stored. The material stored in the hopper 20 is supplied to the plasticizing section 30 through a supply channel 22 provided below the hopper 20 so as to couple the hopper 20 to the ejection section 10. In this embodiment, a first material is stored in the first hopper 20a, and a second material is stored in the second hopper 20b. Therefore, to the first ejection section 10a, the first material stored in the first hopper 20a is supplied, and to the second ejection section 10b, the second material stored in the second hopper 20b is supplied. The first material has a melting temperature lower than that of the second material. In other words, the second material has a melting temperature higher than that of the first material.

The plasticizing section 30 includes a screw case 31, a screw 41 housed in the screw case 31, a drive motor 32 that drives the screw 41, a barrel 50, and a heater 58. The barrel 50 is provided with a communication hole 56. The heater 58 is embedded in the barrel 50. The screw 41 of this embodiment is a so-called flat screw, and is sometimes called "scroll".

The screw 41 has a substantially columnar shape whose height in a direction along its central axis RX is smaller than the diameter. The screw 41 has a grooved face 42 having a screw groove 45 formed therein at a face opposed to the barrel 50. The grooved face 42 is opposed to a screw opposed face 52 of the barrel 50.

The drive motor 32 is coupled to a face at an opposite side to the grooved face 42 of the screw 41. The drive motor 32 is driven under the control of the control unit 90. The screw 41 is rotated around the central axis RX by a torque generated by rotation of the drive motor 32. The drive motor 32 need not be directly coupled to the screw 41, and may be coupled through, for example, a decelerator.

The barrel 50 has a screw opposed face 52 opposed to the grooved face 42 of the screw 41. The communication hole 56 provided in the barrel 50 is formed along the central axis RX of the screw 41.

The nozzle 60 has a nozzle opening 63 at its tip. The nozzle opening 63 communicates with the communication hole 56 provided in the barrel 50. The nozzle 60 ejects the material plasticized by the plasticizing section 30 toward the stage 80 from the nozzle opening 63.

Figure 3:
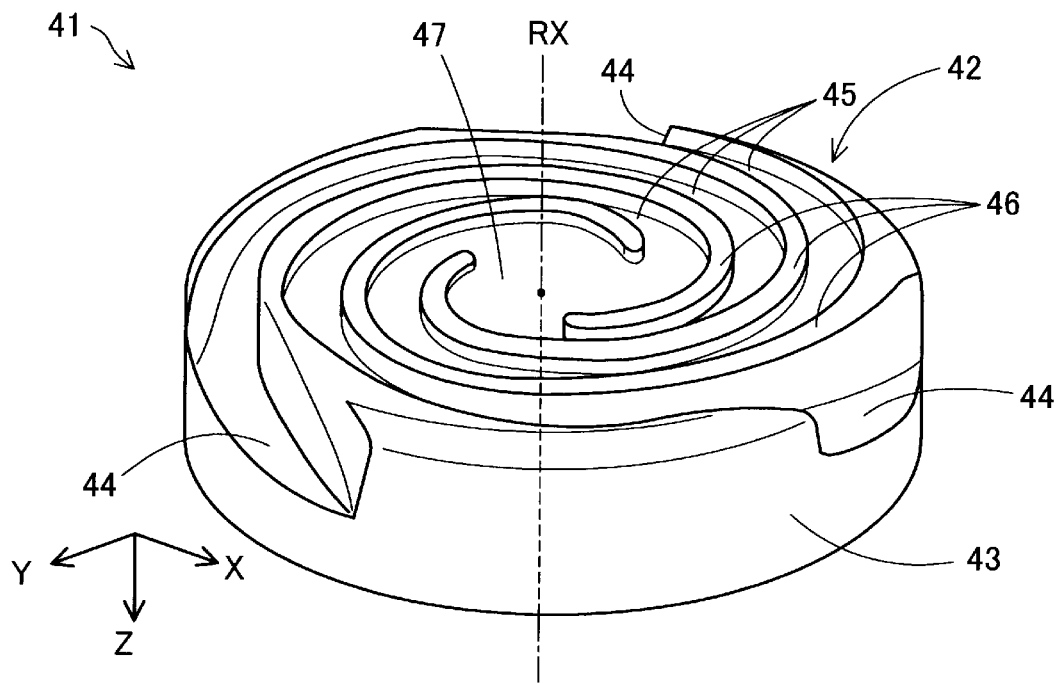
FIG. 3 is a schematic perspective view showing a configuration of a screw.

FIG. 3 is a schematic perspective view showing a configuration of the screw 41 at the grooved face 42 side. In FIG. 3, the position of the central axis RX of the screw 41 is indicated by a long dashed short dashed line. As described above, in the grooved face 42, the screw groove 45 is provided. A screw central portion 47 that is a central portion of the grooved face 42 of the screw 41 is configured as a recess to which one end of the screw groove 45 is coupled. The screw central portion 47 is opposed to the communication hole 56 of the barrel 50. The screw central portion 47 crosses the central axis RX.

The screw groove 45 of the screw 41 constitutes a so-called scroll groove. The screw groove 45 extends in a spiral shape so as to draw an arc toward the outer circumference of the screw 41 from the screw central portion 47. The screw groove 45 may be configured to extend in an involute curve shape or in a helical shape. In the grooved face 42, a projecting ridge portion 46 that constitutes a side wall portion of the screw groove 45 and that extends along each screw groove 45 is provided. The screw groove 45 continues to a material inlet 44 formed in a side face 43 of the screw 41. This material inlet 44 is a portion for receiving the material supplied through the supply channel 22 from the hopper 20.

In FIG. 3, an example of the screw 41 having three screw grooves 45 and three projecting ridge portions 46 is shown. The number of screw grooves 45 or projecting ridge portions 46 provided in the screw 41 is not limited to 3, and only one screw groove 45 may be provided, or two or more multiple screw grooves 45 may be provided. Further, in FIG. 3, an example of the screw 41 in which the material inlet 44 is formed at three sites is shown. The number of sites at which the material inlet 44 is provided in the screw 41 is not limited to 3, and the material inlet 44 may be provided at only one site or may be provided at two or more multiple sites.

Figure 4:
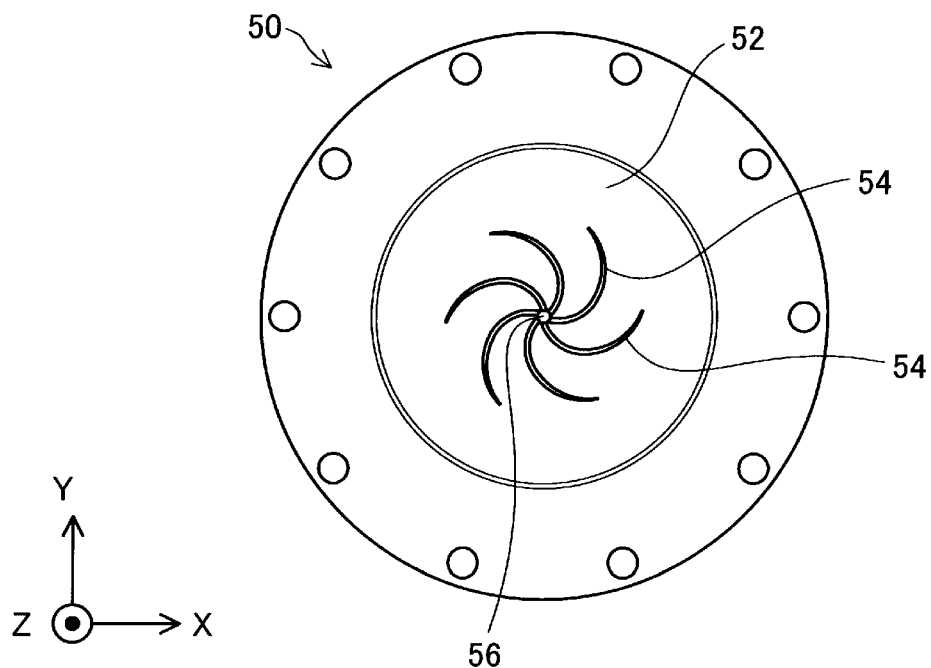
FIG. 4 is a top view showing a configuration of a barrel.

FIG. 4 is a top view showing a configuration of the barrel 50 at the screw opposed face 52 side. As described above, at the center of the screw opposed face 52, the communication hole 56 is formed. Around the communication hole 56 in the screw opposed face 52, multiple guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56. One end of the guide groove 54 need not be coupled to the communication hole 56. Further, in the barrel 50, the guide groove 54 need not be formed.

Referring back to FIG. 1, the injection molding machine 200 includes a plasticizing device 210 and a die clamping device 230. The plasticizing device 210 and the die clamping device 230 are both fixed to a base table 205. In the base table 205, a control unit 290 is provided. The injection molding machine 200 injects a plasticized material from the plasticizing device 210 into a molding die 220 attached to the die clamping device 230 and molds a molded article. In this embodiment, to the die clamping device 230, the molding die 220 made of a metal is attached. The molding die 220 to be attached to the die clamping device 230 is not limited to one made of a metal, and may be made of a resin or a ceramic. The molding die 220 made of a metal is called "metal die".

To the plasticizing device 210, a material supply section 208 to be fed with a material of the molded article is coupled. As the material of the molded article, a material in a pellet form containing an inorganic powder of a metal, a ceramic, or the like, and a binder is used. The plasticizing device 210 plasticizes at least a part of the material supplied from the material supply section 208 to form a plasticized material.

The control unit 290 is constituted by a computer including one or multiple processors, a main storage device, and an input/output interface for performing signal input/output to/from the outside. The control unit 290 controls the plasticizing device 210 and the die clamping device 230 by reading and executing a program in the main storage device by the processor so as to produce the molded article.

Figure 5:
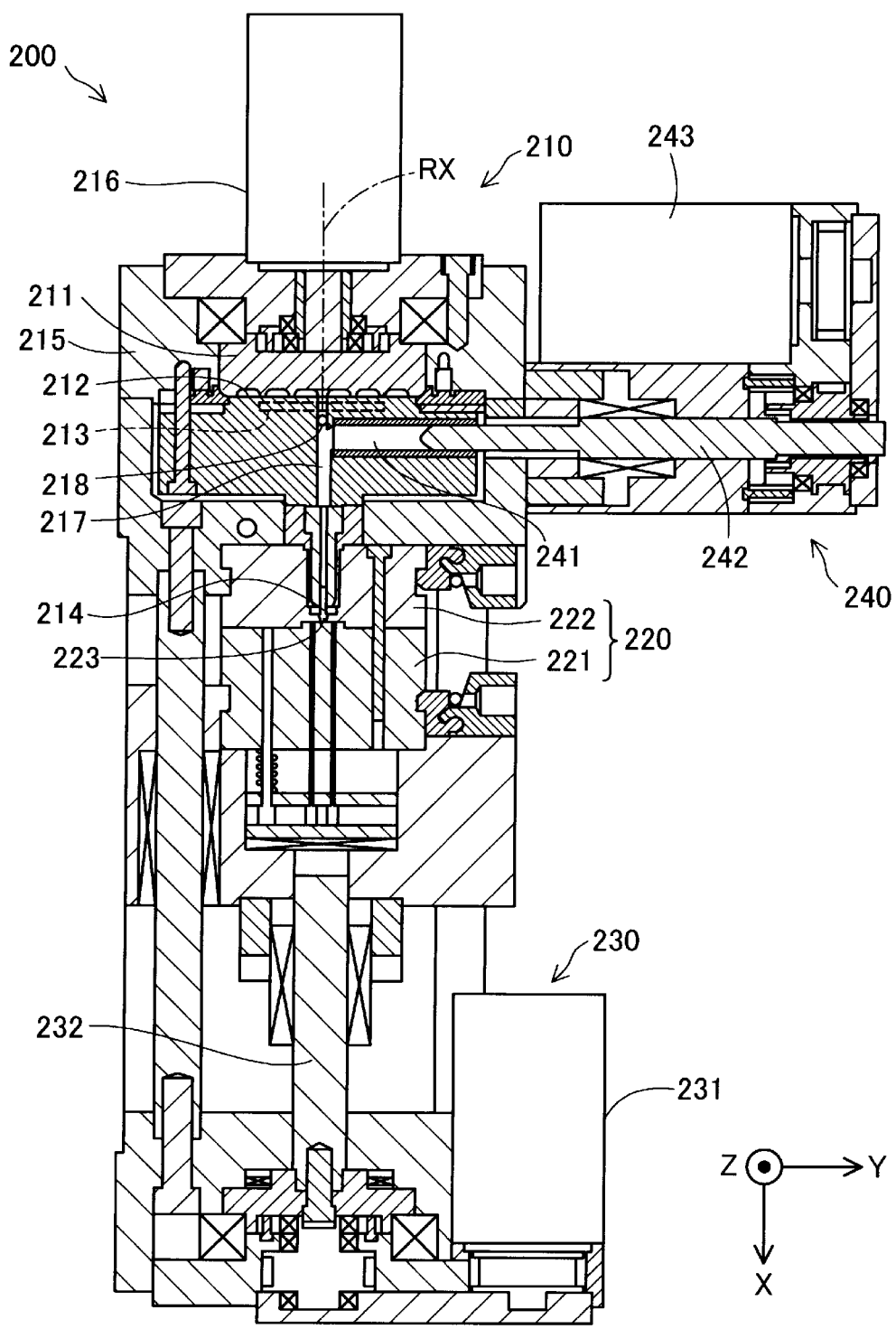
FIG. 5 is a cross-sectional view showing a schematic configuration of an injection molding machine.

FIG. 5 is a cross-sectional view showing a schematic configuration of the injection molding machine 200. The injection molding machine 200 includes the plasticizing device 210, the die clamping device 230, and the molding die 220 as described above, and further includes an injection control mechanism 240.

The plasticizing device 210 includes a screw 211, a barrel 212, a heater 213, and a nozzle 214. The screw 211 is housed in a housing section 215 for housing the screw 211. The screw 211 of this embodiment is a so-called flat screw, and is also called "scroll". The screw 211 is rotatively driven in the housing section 215 around its central axis RX by a screw drive unit 216 including a drive motor. At the center of the barrel 212, a communication hole 217 is formed. To the communication hole 217, the below-mentioned injection cylinder 241 is coupled. In the communication hole 217, a check valve 218 is provided upstream of the injection cylinder 241. The rotation of the screw 211 by the screw drive unit 216 and the heating by the heater 213 are controlled by the control unit 290.

The injection control mechanism 240 includes an injection cylinder 241, a plunger 242, and a plunger drive unit 243 including a drive motor. The injection control mechanism 240 has a function of injecting the plasticized material in the injection cylinder 241 into the below-mentioned cavity 223. The injection control mechanism 240 controls an injection amount of the plasticized material from the nozzle 214 under the control of the control unit 290. The injection cylinder 241 is a member in a substantially cylindrical shape coupled to the communication hole 217 of the barrel 212, and includes the plunger 242 therein. The plunger 242 slides inside the injection cylinder 241, and pressure-feeds the plasticized material in the injection cylinder 241 to the nozzle 214 included in the plasticizing device 210. The plunger 242 is driven by the plunger drive unit 243.

The molding die 220 includes a movable die 221 and a fixed die 222. The movable die 221 and the fixed die 222 are provided opposed to each other. Between the dies, the cavity 223 that is a space corresponding to the shape of the molded article is provided. To the cavity 223, the plasticized material flowing out of the communication hole 217 of the barrel 212 is pressure-fed by the injection control mechanism 240 and injected from the nozzle 214.

The die clamping device 230 includes a molding die drive unit 231 including a drive motor, and has a function of opening and closing the movable die 221 and the fixed die 222. The die clamping device 230 drives the molding die drive unit 231 constituted by a motor so as to rotate a ball screw 232 and move the movable die 221 coupled to the ball screw 232 with respect to the fixed die 222 so as to open and close the molding die 220 under the control of the control unit 290.

As described above, in this embodiment, the three-dimensional shaping apparatus 100 and the injection molding machine 200 each include a flat screw to plasticize a material. On the other hand, the three-dimensional shaping apparatus 100 and the injection molding machine 200 may include an in-line screw to plasticize a material.

Figure 6:
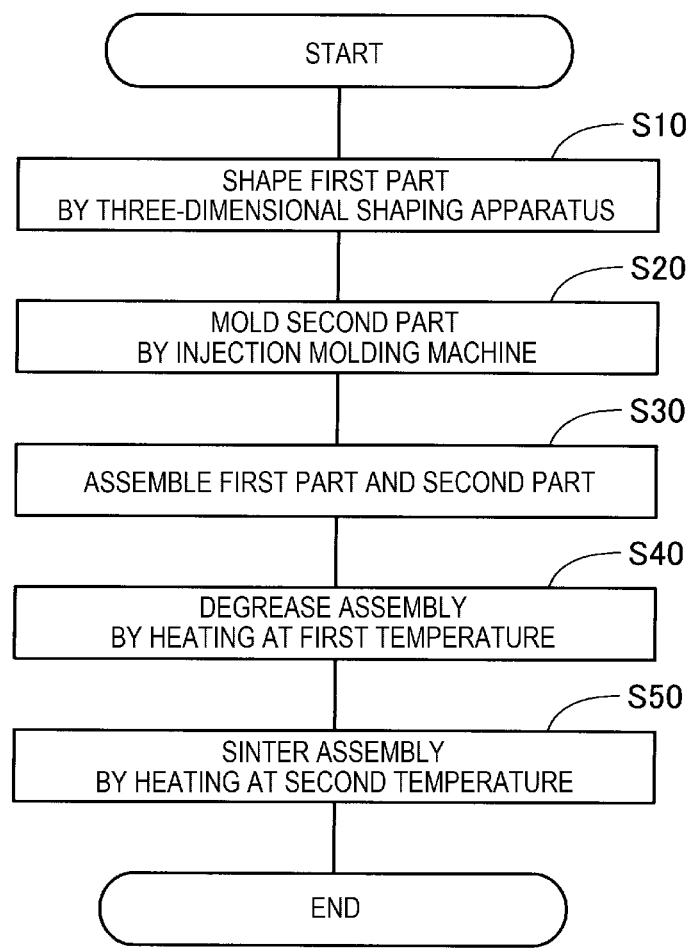
FIG. 6 is a process chart showing a method for producing a product in the first embodiment.

FIG. 6 is a process chart showing a method for producing a product in the first embodiment. In a first step S10, a first part is shaped by the three-dimensional shaping apparatus 100. In a second step S20, a second part is molded by the injection molding machine 200. The order of the first step S10 and the second step S20 is arbitrary, and the steps may be performed simultaneously. The first part shaped by the three-dimensional shaping apparatus 100 and the second part molded by the injection molding machine 200 are each called "green body".

Figure 7:
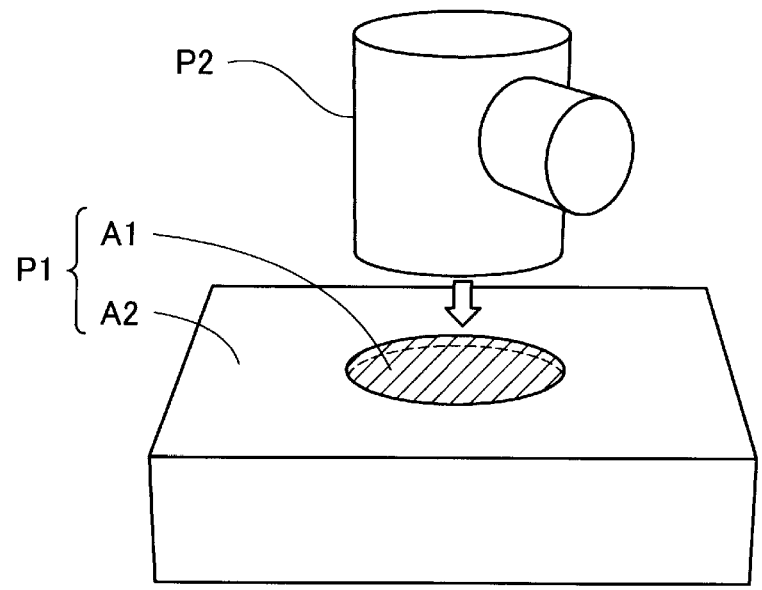
FIG. 7 is a view showing an example of a first part and an example of a second part.

FIG. 7 is a view showing an example of a first part P1 and an example of a second part P2. In FIG. 7, the first part P1 in a rectangular parallelepiped shape and the second part P2 having a shape in which two columns are coupled so that the central axes thereof cross each other are shown. The shape of the first part P1 and the shape of the second part P2 are not limited to the shapes shown in FIG. 7, and various shapes can be adopted.

The first part P1 includes a first region A1 and a second region A2. The first region A1 is a region that comes in contact with the second part P2, and is formed as a circular region at the upper face of the first part P1. The first region A1 is also referred to as "joint region". The second region A2 is a region that does not come in contact with the second part P2.

In the first step S10, the three-dimensional shaping apparatus 100 shapes the first region A1 by plasticizing and ejecting a first material containing SUS and a first binder from the first ejection section 10a. The three-dimensional shaping apparatus 100 shapes the second region A2 other than the first region A1 by plasticizing and ejecting a second material containing SUS and a second binder from the second ejection section 10b. In this embodiment, the inorganic powder used in the first region A1 and the inorganic powder used in the second region A2 are the same SUS and contain the same element as a main component. The main component means a major element of the inorganic powder and refers to an element whose content ratio is highest in the inorganic powder.

In this embodiment, the first binder and the second binder each contain a resin and a wax. However, in the first binder and the second binder, by using different types of resins, the melting point of the first binder contained in the first region A1 is lower than the melting point of the second binder contained in the second region A2. More specifically, the melting point of the first binder is lower than the temperature at which the wax component is removed in the below-mentioned degreasing treatment, and the melting point of the second binder is higher than the temperature at which the wax component is removed in the below-mentioned degreasing treatment. The first binder and the second binder can also be referred to as "low melting point binder" and "high melting point binder", respectively.

As the resin used in the first binder and the resin used in the second binder, resins can be adopted from general-purpose engineering plastics such as a polystyrene resin (PS), a polyethylene resin (PE), a polypropylene resin (PP), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and thermoplastic resins such as polysulfone, polyethersulfone, polyphenylene sulfide, polyarylate, polyimide, polyamideimide, polyetherimide, and polyether ether ketone (PEEK) so as to satisfy the above-mentioned melting points.

In this embodiment, the first part P1 is shaped by the three-dimensional shaping apparatus 100, and therefore, it is difficult to form the first part P1 in a small and complicated shape, but the first part P1 can be formed in a shape having a relatively large size.

In this embodiment, the first material and the second material are configured to contain SUS as the inorganic powder, however, it is not limited to SUS, and a single metal of magnesium (Mg), iron (Fe), cobalt (Co), chromium (Cr), aluminum (Al), titanium (Ti), copper (Cu), or nickel (Ni), or an alloy containing one or more of these metals, or an alloy such as a maraging steel, cobalt-chromium-molybdenum, a titanium alloy, a nickel alloy, an aluminum alloy, a cobalt alloy, or a cobalt-chromium alloy may be used. Further, the inorganic powder is not limited to a metal, and an oxide ceramic such as silicon dioxide, titanium dioxide, aluminum oxide, or zirconium oxide, a non-oxide ceramic such as aluminum nitride, or the like may be used.

In this embodiment, the second part P2 is molded by injecting the same material as that of the second region A2 of the first part P1 to the molding die 220 by the injection molding machine 200 in the second step S20. The inorganic powder used in the second part P2 may be a different powder from the inorganic powder used in the first part P1. Further, the resin of the binder used in the second part P2 may be a resin of a different type from that of the resin used in the second region A2 of the first part P1 as long as the melting point is higher than the temperature at which the wax component is removed in the below-mentioned degreasing treatment.

In this embodiment, the second part P2 is molded by the injection molding machine 200, and therefore, it is difficult to form the second part P2 in a large shape, but the second part P2 can be formed in a small and complicated shape without using a support material or the like.

Figure 8:
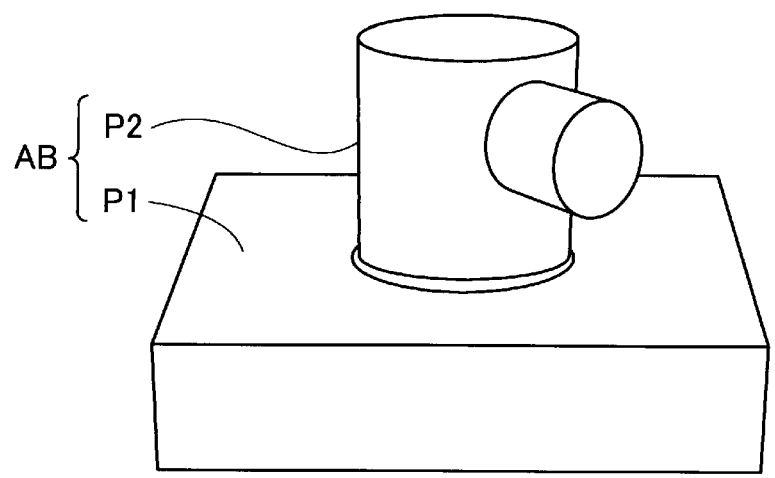
FIG. 8 is a view showing an assembly obtained by assembling the first part and the second part.

In the third step S30, the first part P1 and the second part P2 are assembled, whereby an assembly is obtained. The assembling of the first part P1 and the second part P2 can be performed by, for example, a robot. In this embodiment, as shown in FIG. 7, the assembling is performed by placing the second part P2 in the first region A1 of the first part P1. In FIG. 8, an assembly AB obtained by assembling the first part P1 and the second part P2 is shown.

In the fourth step S40, by the degreasing device 300, a degreasing treatment of degreasing the assembly AB by heating at a first temperature is performed. The first temperature is a temperature for removing the wax component contained in the first part P1 and the second part P2 and is, for example, 110° C. The melting point of the resin contained in the first region A1 of the first part P1 is a temperature lower than the first temperature. Therefore, the first region A1 is softened by the degreasing treatment, and the first part P1 and the second part P2 favorably come in contact with each other in the first region A1. In the fourth step S40, after the wax component is removed at the first temperature, the first temperature is increased to 400 to 500° C., and the resin component in the binder contained in the assembly AB is removed.

In the fifth step S50, by the sintering furnace 400, the assembly AB after degreasing is sintered by heating at a second temperature higher than the first temperature. The second temperature is, for example, 1200° C. By the above-mentioned series of steps, a product composed of the first part P1 and the second part P2 is produced.

According to the method for producing a product in the above-mentioned first embodiment, by switching multiple materials by the three-dimensional shaping apparatus 100 including multiple ejection sections 10, a material containing a binder having a low melting point can be selectively placed in the first region A1 that is a joint region between the first part P1 and the second part P2. Therefore, when the first part P1 and the second part P2 are degreased by heating, the binder component of the first part P1 in the joint region is melted, and the occurrence of a gap between the first part P1 and the second part P2 can be suppressed. As a result, a product can be produced by favorably joining multiple parts together using a simple method.

Further, in this embodiment, the second part P2 is molded by the injection molding machine 200, and therefore, the second part P2 can be formed in a short time, and moreover, the second part P2 having a complicated shape can be produced without using a support material. In addition, in this embodiment, the first part P1 is shaped by the three-dimensional shaping apparatus 100, and therefore, a hollow structure or a thinning structure can be easily formed, and therefore, a large first part P1 can be shaped. Accordingly, by joining the first part P1 to the second part P2, a large product that has a complicated shape and does not depend on the size of the metal die of the injection molding machine 200 can be produced.

Further, in this embodiment, the inorganic powder contained in the first region A1 of the first part P1 contains the same element as the inorganic powder contained in the second region A2 as the main component, and therefore, the first part P1 and the second part P2 can be joined together without using a wax or the like in the joint region. Accordingly, a decrease in the strength of the product at the joint region can be suppressed.

B. Second Embodiment

In a second embodiment, the configuration of the production system 5 and a series of steps of the method for producing a product are the same as those of the first embodiment. In the first embodiment, the first material used for shaping the first region A1 of the first part P1 and the second material used for shaping the second region A2 use binders having different melting points. On the other hand, in the second embodiment, the particle diameter of the inorganic powder of the first material used for shaping the first region A1 of the first part P1 is made smaller than the particle diameter of the inorganic powder of the second material used for shaping the second region A2. In this embodiment, the particle diameter refers to a central particle diameter.

More specifically, in the second embodiment, as the inorganic powder contained in the first material, SUS having a central particle diameter of 5 μm is used. Further, as the inorganic powder contained in the second material, SUS having a central particle diameter of 10 μm is used. In this manner, by using the powder having a small particle diameter in the first region A1 that is the joint region in which the first part P1 and the second part P2 are joined together, diffusion joining in the joint region is accelerated during sintering, and the sintering start temperature in the joint region can be lowered. For example, when SUS having a central particle diameter of 5 μm is used as the inorganic powder contained in the first material, and SUS having a central particle diameter of 10 μm is used as the inorganic powder contained in the second material, the sintering start temperature in the joint region can be lowered to 1150° C. from 1200° C. As a result, joining of the first part P1 to the second part P2 can be favorably performed starting from the first region A1 of the first part P1.

According to the second embodiment described above, by the three-dimensional shaping apparatus 100, a material containing an inorganic powder having a small particle diameter can be placed in the joint region of the first part P1 and the second part P2. Therefore, when the first part P1 and the second part P2 are sintered, sintering starts early in the joint region and these parts can be favorably joined together. As a result, a product can be produced by joining multiple parts together using a simple method. In this embodiment, the types of the binders contained in the first material and the second material may be the same or different. However, as in the first embodiment, it is preferred that the melting point of the first binder contained in the first material is lower than the melting point of the second binder contained in the second material.

C. Third Embodiment

In a third embodiment, the configuration of the production system 5 and a series of steps of the method for producing a product are the same as those of the first embodiment.

In the third embodiment, the particle density of the inorganic powder in the first material used in the three-dimensional shaping apparatus 100 is made higher than the particle density of the inorganic powder in the second material, whereby the particle density of the first region A1 of the first part P1 is made higher than the particle density of the second region A2 of the first part P1 before the fourth step S40 shown in FIG. 6, that is, before the degreasing treatment. Specifically, the particle density of the first material is increased by decreasing the binder part number of the first material used in the first region A1 as compared to the binder part number of the second material used in the second region A2. For example, in this embodiment, the formulation of the first material used in the first region A1 is set as follows: the binder: 7.0 g with respect to 100 g of SUS, whereby the binder part number is set to 7.0, and the formulation of the second material used in the second region A2 is set as follows: the binder: 8.5 g with respect to 100 g of SUS, whereby the binder part number is set to 8.5.

According to the third embodiment described above, by decreasing the particle density of the first region A1 contained in the first part P1, a gap between the inorganic particle contained in the first part P1 and the inorganic particle contained in the second part P2 can be made narrower in the assembly AB. Therefore, the joint portion of the first part P1 and the second part P2 can be prevented from becoming weak after sintering. The types of the resins and the types of the binders contained in the first material and the second material are the same as those of the first embodiment. Further, the particle diameters of the inorganic particles may be the same between the first material and the second material, or may be different between the first material and the second material as in the second embodiment.

D. Fourth Embodiment

Figure 9:
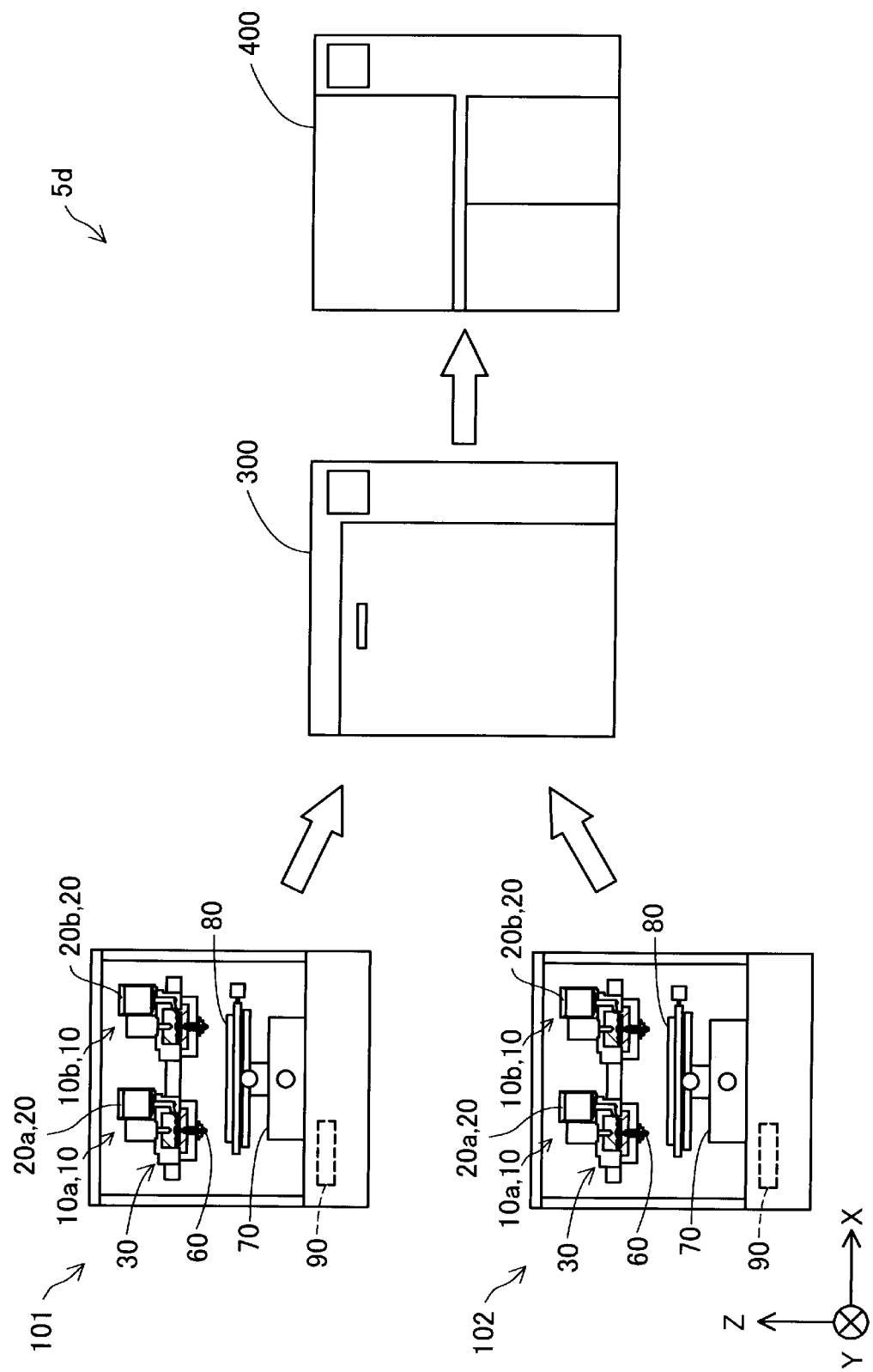
FIG. 9 is a view showing a schematic configuration of a production system in a fourth embodiment.

FIG. 9 is a view showing a schematic configuration of a production system 5d in a fourth embodiment. The production system 5d includes a first three-dimensional shaping apparatus 101, a second three-dimensional shaping apparatus 102, a degreasing device 300, and a sintering furnace 400. That is, in the fourth embodiment, the second three-dimensional shaping apparatus 102 is included in the production system 5d in place of the injection molding machine 200. The configurations of the first three-dimensional shaping apparatus 101 and the second three-dimensional shaping apparatus 102 are the same as the configuration of the three-dimensional shaping apparatus 100 in the first embodiment. In each of the first three-dimensional shaping apparatus 101 and the second three-dimensional shaping apparatus 102, a hopper 20, a plasticizing section 30, and a nozzle 60 are included. As a material used for producing a product in the fourth embodiment, any material described in the first to third embodiment can be adopted.

Figure 10:
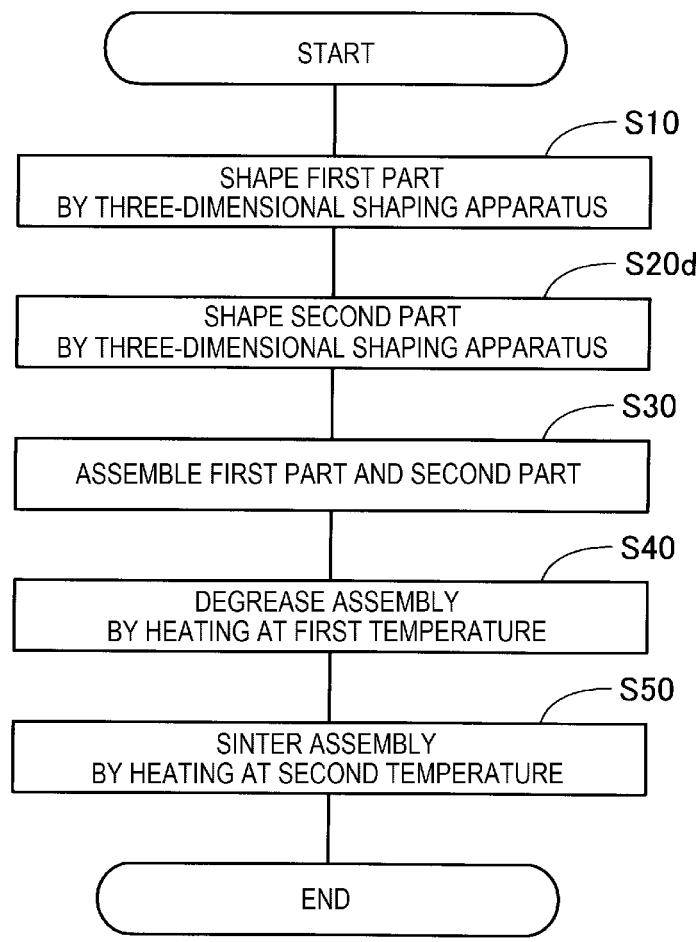
FIG. 10 is a process chart showing a method for producing a product in the fourth embodiment.

FIG. 10 is a process chart showing a method for producing a product in the fourth embodiment. In this embodiment, in a first step S10, a first part P1 is shaped by the first three-dimensional shaping apparatus 101. In a second step S20d, a second part P2 is shaped by the second three-dimensional shaping apparatus 102 instead of the injection molding machine 200. The order of the first step S10 and the second step S20d is arbitrary, and the steps may be performed simultaneously. The process contents of a third step S30 to a fifth step S50 are the same as those of the first embodiment. By the above-mentioned series of steps, in this embodiment, a product is produced by joining the first part to the second part shaped by the three-dimensional shaping apparatuses.

According to the fourth embodiment described above, the first part P1 and the second part P2 are shaped by the three-dimensional shaping apparatuses 101 and 102, and these parts are joined together, and therefore, a product having a size exceeding a size that can be shaped at once by the three-dimensional shaping apparatuses 101 and 102 can be produced. Therefore, the degree of freedom for designing the product can be increased.

Further, in this embodiment, the first three-dimensional shaping apparatus 101 and the second three-dimensional shaping apparatus 102 each include the hopper 20, and therefore, the first part P1 and the second part P2 can be shaped using pellets of the same type by the first three-dimensional shaping apparatus 101 and the second three-dimensional shaping apparatus 102. Therefore, the physical properties can be prevented from changing between the first part P1 and the second part P2, and the quality of the product can be enhanced.

E. Fifth Embodiment

Figure 11:
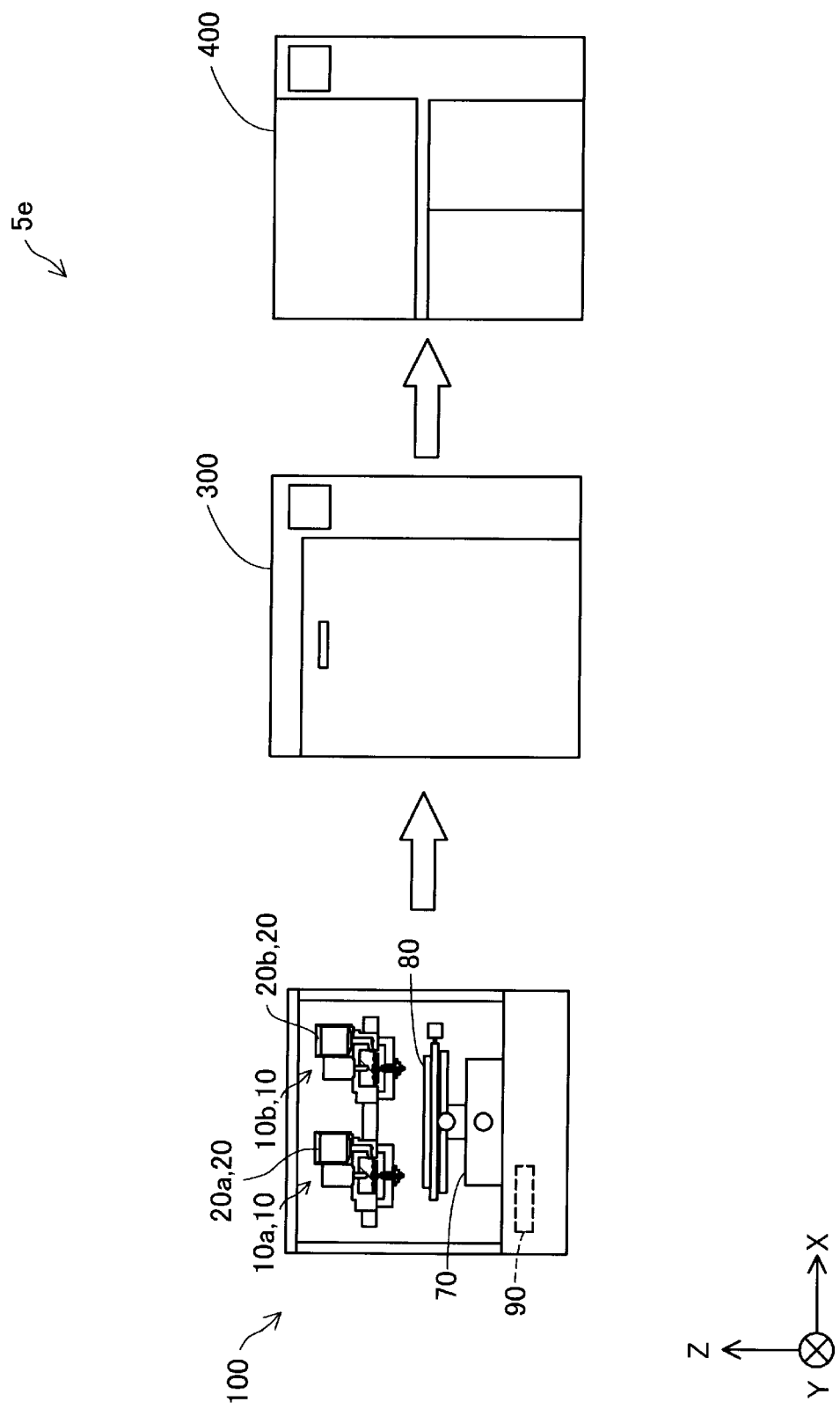
FIG. 11 is a view showing a schematic configuration of a production system in a fifth embodiment.

FIG. 11 is a view showing a schematic configuration of a production system 5e in a fifth embodiment. The production system 5e includes a three-dimensional shaping apparatus 100, a degreasing device 300, and a sintering furnace 400. That is, the production system 5e of the fifth embodiment includes only one three-dimensional shaping apparatus 100 and does not include an injection molding machine 200.

Figure 12:
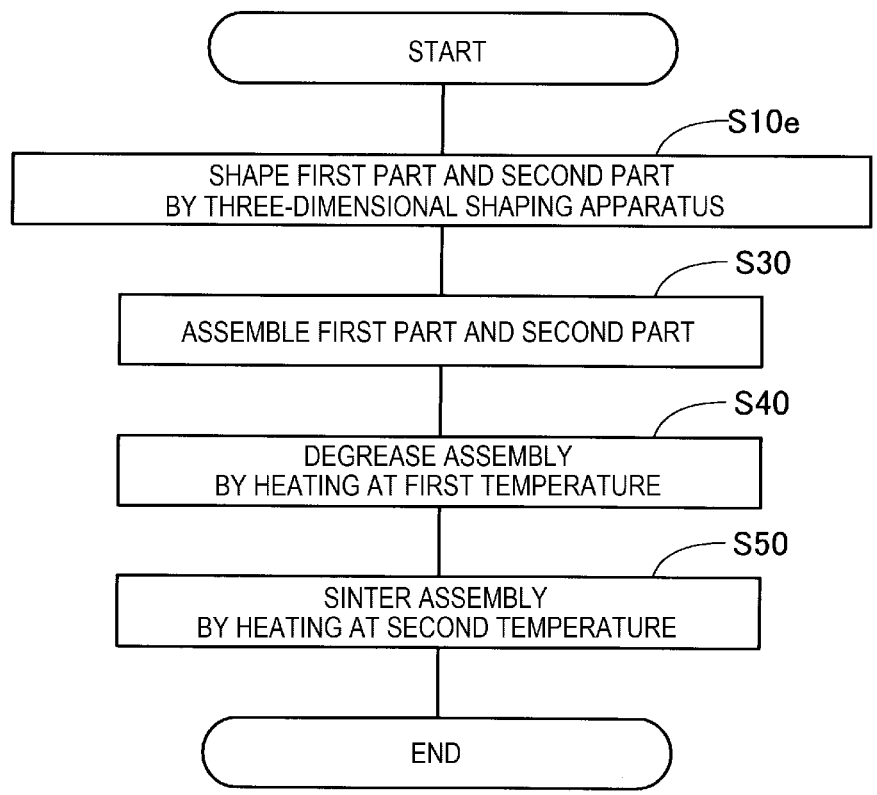
FIG. 12 is a process chart showing a method for producing a product in the fifth embodiment.
Figure 13:
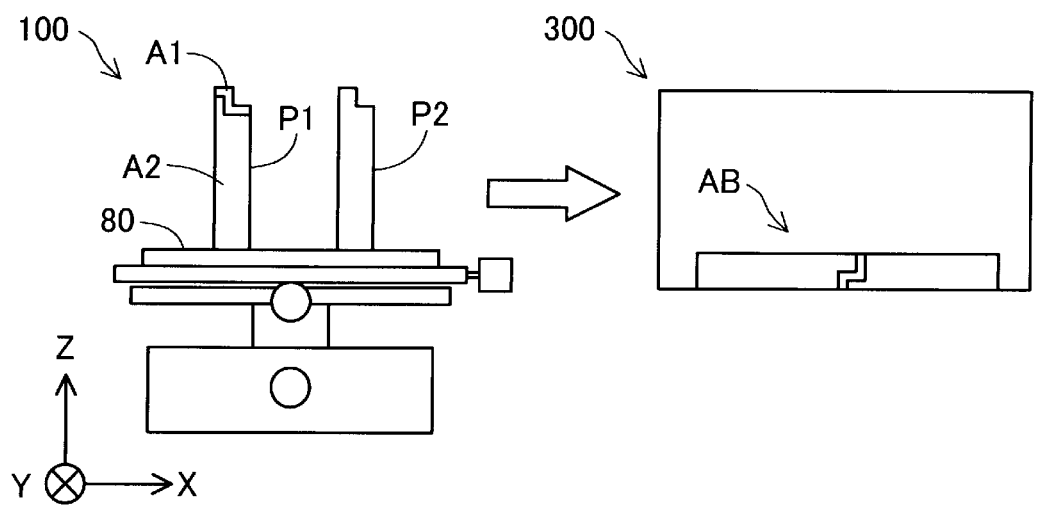
FIG. 13 is an explanatory view showing an outline of the method for producing a product in the fifth embodiment.

FIG. 12 is a process chart showing a method for producing a product in the fifth embodiment. FIG. 13 is an explanatory view showing an outline of the method for producing a product in the fifth embodiment. In this embodiment, in a first step S10e, a first part P1 and a second part P2 are shaped in a parallel manner on the same stage 80 by the three-dimensional shaping apparatus 100. At a left side in FIG. 13, a manner in which a long first part P1 and a long second part P2 are shaped along the vertical direction is shown. In the first step S10e of this embodiment, it can be said that a first step for shaping the first part P1 and a second step for shaping the second part P2 are performed simultaneously.

In a third step S30, the first part P1 and the second part P2 are assembled. At a right side in FIG. 13, a manner in which an assembly AB obtained by assembling the first part P1 and the second part P2 is placed in the degreasing device 300 is shown. In this embodiment, a first region A1 is shaped so as to have a level difference in an end portion of the first part P1, and when the first part P1 and the second part P2 are assembled, these parts are placed so that a level difference formed in an end portion of the second part P2 overlaps with the level difference of the first part P1. The assembly AB obtained by assembling in this manner is degreased in a fourth step S40 and sintered in a fifth step S50. The shape of a joint portion of the first part P1 and the second part P2 is not limited to the shape shown in FIG. 13, and for example, one of the joint parts can be formed in a convex shape, and the other joint part can be formed in a concave shape.

According to the fifth embodiment described above, the first part P1 and the second part P2 can be shaped simultaneously in a parallel manner by one three-dimensional shaping apparatus 100, and therefore, a product can be efficiently produced. Further, space efficiency when shaping the first part P1 and the second part P2 can be enhanced. Moreover, the first part P1 and the second part P2 can be formed under the same environmental conditions such as the same humidity and the same temperature, and therefore, the quality of the product can be prevented from becoming uneven among parts. Further, a product having a size exceeding the largest size that can be shaped by the three-dimensional shaping apparatus 100 can be produced.

The present disclosure is not limited to the above-mentioned embodiments, and the first part P1 may be shaped by a three-dimensional shaping apparatus of a different system such as a binder jetting system or a material jetting system.

F. Other Aspects

The present disclosure is not limited to the above-mentioned embodiments, but can be realized in various aspects without departing from the gist thereof. For example, the technical features in the embodiments corresponding to technical features in the respective aspects described below may be appropriately replaced or combined for solving part or all of the above-mentioned problems or achieving part or all of the above-mentioned effects. Further, the technical features may be appropriately deleted unless they are described as essential features in the present specification.

(1) According to the first aspect of the present disclosure, a production method for producing a product by joining a first part containing an inorganic powder and a binder to a second part containing an inorganic powder and a binder is provided. The production method includes a first step of forming the first part by a three-dimensional shaping apparatus, a second step of forming the second part, a third step of assembling the first part and the second part, thereby obtaining an assembly, a fourth step of heating the assembly at a first temperature, and a fifth step of heating the assembly at a second temperature higher than the first temperature after the fourth step, wherein the first part has a first region that comes in contact with the second part and a second region that does not come in contact with the second part, and a melting point of the binder contained in the first region is lower than a melting point of the binder contained in the second region. According to such an aspect, a material containing a binder having a low melting point can be placed in a joint region of the first part and the second part by the three-dimensional shaping apparatus. Therefore, when the first part and the second part are degreased by heating in the fourth step, the binder component of the first part is melted in the joint region, and the occurrence of a gap between the first part and the second part can be suppressed. As a result, a product can be produced by favorably joining multiple parts together using a simple method.

(2) According to the second aspect of the present disclosure, a production method for producing a product by joining a first part containing an inorganic powder and a binder to a second part containing an inorganic powder and a binder is provided. The production method includes a first step of forming the first part by a three-dimensional shaping apparatus, a second step of forming the second part, a third step of assembling the first part and the second part, thereby obtaining an assembly, a fourth step of heating the assembly at a first temperature, and a fifth step of heating the assembly at a second temperature higher than the first temperature after the fourth step, wherein the first part has a first region that comes in contact with the second part and a second region that does not come in contact with the second part, and a particle diameter of the inorganic powder contained in the first region is smaller than a particle diameter of the inorganic powder contained in the second region. According to such an aspect, a material containing an inorganic powder having a small particle diameter can be placed in a joint region of the first part and the second part by the three-dimensional shaping apparatus. Therefore, when the first part and the second part are sintered in the fifth step, sintering starts early in the joint region, and these parts can be favorably joined together. As a result, a product can be produced by favorably joining multiple parts together using a simple method.

(3) In the above aspect, in the second step, the second part may be formed by an injection molding machine. According to such an aspect, the second part is formed by an injection molding machine, and therefore, the second part having a complicated shape can be produced without using a support material. Further, the first part is shaped by the three-dimensional shaping apparatus, and therefore, a large first part can be shaped. Accordingly, by joining the first part to the second part, a large product having a complicated shape can be produced.

(4) In the above aspect, in the second step, the second part may be formed by a three-dimensional shaping apparatus. According to such an aspect, the first part and the second part are each shaped by the three-dimensional shaping apparatus, and these parts are joined together, and therefore, a product having a size exceeding a size that can be shaped at once by the three-dimensional shaping apparatus can be produced.

(5) In the above aspect, the three-dimensional shaping apparatus used in the first step and the three-dimensional shaping apparatus used in the second step may each include a hopper to which a material in a pellet form is fed, a plasticizing section that plasticizes the material, and a nozzle that ejects the plasticized material. According to such an aspect, the first part and the second part can be formed using pellets of the same type by the first three-dimensional shaping apparatus and the second three-dimensional shaping apparatus. Therefore, the physical properties can be prevented from changing between the first part and the second part.

(6) In the above aspect, the three-dimensional shaping apparatus used in the first step and the three-dimensional shaping apparatus used in the second step may be the same three-dimensional shaping apparatus, and the first part and the second part may be formed in a parallel manner on a same stage included in the three-dimensional shaping apparatus. According to such an aspect, space efficiency when forming the first part and the second part can be enhanced. Further, the first part and the second part can be formed under the same environmental conditions such as the same humidity and the same temperature, and therefore, the quality of the product can be prevented from becoming uneven among parts.

(7) In the above aspect, a particle density of the inorganic powder in the first region may be higher than a particle density of the inorganic powder in the second region before the fourth step. According to such an aspect, the joint portion of the first part and the second part can be prevented from becoming weak after sintering.

(8) In the above aspect, the inorganic powder contained in the first region may contain, as a main component, a same element as the inorganic powder contained in the second region. According to such an aspect, the first part and the second part can be joined together without using a wax or the like in the joint region. Accordingly, a decrease in the strength of the product at the joint region can be suppressed.

What is claimed is:

1. A production method for producing a product by joining a first part containing an inorganic powder and a binder to a second part containing an inorganic powder and a binder, comprising:
   a first step of forming the first part by a three-dimensional shaping apparatus;
   a second step of forming the second part;
   a third step of assembling the first part and the second part, thereby obtaining an assembly;
   a fourth step of heating the assembly at a first temperature; and
   a fifth step of heating the assembly at a second temperature higher than the first temperature after the fourth step, wherein
   the first part has a first region that comes in contact with the second part and a second region that does not come in contact with the second part,
   a melting point of the binder contained in the first region is lower than a melting point of the binder contained in the second region, and
   the fourth step comprises heating the assembly to the first temperature to melt the binder in the first region, without melting the binder in the second region, to suppress formation of a gap between the first part and the second part before the fifth step of heating the assembly at the second temperature, and subsequently heating the assembly to a third temperature higher than the first temperature and lower than the second temperature to remove the binder in the first part and the binder in the second part.

2. The production method according to claim 1, wherein in the second step, the second part is formed by an injection molding machine.

3. The production method according to claim 1, wherein in the second step, the second part is formed by a three-dimensional shaping apparatus.

4. The production method according to claim 3, wherein the three-dimensional shaping apparatus used in the first step and the three-dimensional shaping apparatus used in the second step each include a hopper to which a material in a pellet form is fed, a plasticizing section that plasticizes the material, and a nozzle that ejects the plasticized material.

5. The production method according to claim 4, wherein the three-dimensional shaping apparatus used in the first step and the three-dimensional shaping apparatus used in the second step are the same three-dimensional shaping apparatus, and the first part and the second part are formed in a parallel manner on a same stage included in the three-dimensional shaping apparatus.

6. The production method according to claim 1, wherein a particle density of the inorganic powder in the first region is higher than a particle density of the inorganic powder in the second region before the fourth step.

7. The production method according to claim 1, wherein the inorganic powder contained in the first region contains, as a main component, a same element as the inorganic powder contained in the second region.

8. A production method for producing a product by joining a first part containing an inorganic powder and a binder to a second part containing an inorganic powder and a binder, comprising:
   a first step of forming the first part by a three-dimensional shaping apparatus;
   a second step of forming the second part;
   a third step of assembling the first part and the second part, thereby obtaining an assembly;
   a fourth step of heating the assembly at a first temperature; and
   a fifth step of heating the assembly at a second temperature higher than the first temperature after the fourth step, wherein
   the first part has a first region that comes in contact with the second part and a second region that does not come in contact with the second part,
   a particle diameter of the inorganic powder contained in the first region is smaller than a particle diameter of the inorganic powder contained in the second region, and the fourth step comprises heating the assembly to the first temperature to melt the binder in the first region, without melting the binder in the second region, to suppress formation of a gap between the first part and the second part before the fifth step of heating the assembly at the second temperature, and subsequently heating the assembly to a third temperature higher than the first temperature and lower than the second temperature to remove the binder in the first part and the binder in the second part.

\* \* \* \* \*